US005893988A

United States Patent [19]

Tomioka

[11] Patent Number: 5,893,988

[45] Date of Patent: Apr. 13, 1999

[54] HYBRID CIRCUIT TRIMMING SYSTEM AND METHOD INCLUDING PROTECTIVE LIGHT-INTERCEPTING CAP

[75] Inventor: Masanori Tomioka, Tokyo, Japan

[73] Assignee: Mitsubishi Denki Kabushiki Kaisha, Tokyo, Japan

[21] Appl. No.: 08/558,912

[22] Filed: Nov. 13, 1995

[30] Foreign Application Priority Data

Jul. 17, 1995 [JP] Japan .................................... 7-180121

[51] Int. Cl.$^{6}$ .................................................... B23K 26/00

[52] U.S. Cl. ................................ 219/121.68; 219/121.69

[58] Field of Search ......................... 219/121.68, 121.69, 219/121.6, 121.85; 338/195; 29/610.1, 620, 847; 438/382, 940

[56] References Cited

U.S. PATENT DOCUMENTS

| | | | |
|---|---|---|---|
| 4,179,310 | 12/1979 | Compton et al. | 219/121.6 |
| 4,580,030 | 4/1986 | Takeuchi | 219/121.69 |
| 4,581,628 | 4/1986 | Miyauchi et al. | 219/121.85 |
| 4,792,779 | 12/1988 | Pond et al. | 338/195 |
| 4,998,207 | 3/1991 | Postlewait | 219/121.69 |
| 5,298,717 | 3/1994 | DeRossett, Jr. | 219/121.68 |
| 5,446,259 | 8/1995 | Engstrom | 219/121.69 |
| 5,477,023 | 12/1995 | Schneider et al. | 219/121.68 |

FOREIGN PATENT DOCUMENTS

| | | | |
|---|---|---|---|
| 3-129845 | 6/1991 | Japan . | |
| 5-177368 | 7/1993 | Japan | 219/121.6 |

*Primary Examiner*—Gregory L. Mills

[57] ABSTRACT

A trimming apparatus for a hybrid integrated circuit having a thick film substrate (1) and a semiconductor element (2) disposed on the thick film substrate (1), the trimming apparatus having a light-intercepting cap (11) which is pressed against the thick film substrate (1) so as to cover the semiconductor element (2) on the thick film substrate (1) in time of a trimming treatment, and a spring (10) for pressing the light-intercepting cap (11) against the thick film substrate (1) in time of the trimming treatment, the spring (10) being disposed on the light-intercepting cap (11).

13 Claims, 4 Drawing Sheets

HYBRID CIRCUIT TRIMMING SYSTEM AND METHOD INCLUDING PROTECTIVE LIGHT-INTERCEPTING CAP

FIELD OF THE INVENTION

The present invention relates to a trimming apparatus and a trimming method for performing a functional trimming treatment against a resistive portion in a hybrid integrated circuit.

DESCRIPTION OF THE PRIOR ART

In FIG. 1, there is shown a hybrid integrated circuit which is subjected to a functional trimming treatment in accordance with the technical field of the present invention.

As shown in FIG. 1, the hybrid integrated circuit comprises a thick film substrate 1, a semiconductor element 2 connected onto the thick film substrate 1 by means of flip chip bonding, on-board members 3 loaded on the thick film substrate 1 such as a chip condenser and the like, a thick film resistor 4 which is subjected to a functional trimming treatment, a protective cap 5 joined to the thick film substrate 1, a gel material 6 poured into the space formed within the protective cap 5, and electrode pads 7 for connecting the hybrid integrated circuit to outer electrical devices. Hereat, the functional trimming treatment is performed in order to trim away a part of the thick film resistor 4 (resistive portion) in the hybrid integrated circuit by means of laser beam so as to adjust the resistance value of the thick film resistor 4. This adjustment of the resistance value is generally performed on condition that the hybrid integrated circuit is set to an operating (active) mode. Therefore, the functional trimming treatment is performed against the thick film resistor 4 at first, and then the protective cap 5 and the gel material 6 are loaded on the hybrid integrated circuit so that the hybrid integrated circuit is completed.

However, in such a conventional functional trimming technique, there is such a problem as follows. Namely, since the laser beam for trimming away a part of the thick film resistor 4 is dispersed on the surface of the thick film substrate 1 in time of the functional trimming treatment, the dispersed laser beam is applied to the surface of the semiconductor element 2 through an interstice which is formed by bumps of the semiconductor element 2 connected to the thick film substrate 1 by flip chip bonding so that an incorrect action of the semiconductor element 2 may be caused. Therefore, it is difficult to adjust the electrical characteristic correctly, namely to perform a correct trimming by the conventional functional trimming technique.

Thus, in the conventional functional trimming technique, when the functional trimming treatment is performed against the hybrid integrated circuit in which the semiconductor element 2 is exposed outward on the thick film substrate 1, the semiconductor element 2 is generally covered (capped) with a black light-intercepting cap made of epoxy resin prior to the functional trimming treatment.

However, in the above-mentioned conventional trimming technique, although the semiconductor element is covered with the light-intercepting cap in time of the functional trimming treatment, the laser beam virtually escapes into the space formed within the light-intercepting cap through the interstice between the light-intercepting cap and the thick film substrate so that the escaping laser beam is applied to the surface of the semiconductor element. Thus, it is probable that the semiconductor element acts incorrectly in the trimming treatment. Namely, in the conventional light-intercepting technique, a sufficient light-intercepting effect is not achieved so that a correct trimming is not performed.

SUMMARY OF THE INVENTION

The present invention has been developed to solve the above-mentioned conventional problem, and has an object of providing a trimming apparatus and a trimming method for the hybrid integrated circuit, which can improve the light-intercepting ability against the semiconductor element in time of the functional trimming treatment, thus to perform a correct trimming treatment.

Thus, according to a first aspect of the present invention, which is developed to achieve the above-mentioned objects, there is provided a trimming apparatus for a hybrid integrated circuit which includes a thick film substrate and a semiconductor element disposed on the thick film substrate, characterized in that said trimming apparatus comprises, a light-intercepting cap which is pressed against the thick film substrate so as to cover the semiconductor element on the thick film substrate in time of a trimming treatment, and an elastic member for pressing the light-intercepting cap against the thick film substrate in time of the trimming treatment, the elastic member being disposed on the light-intercepting cap. In the trimming apparatus, since the light-intercepting cap contacts to the thick film substrate very tightly in time of the trimming treatment, laser beam does not escape into the space formed in the light-intercepting cap in which the semiconductor element is accommodated. Consequently, the correct trimming treatment is performed against the resistive portion of the hybrid integrated circuit so that the variation of the electrical characteristic of the hybrid integrated circuit is reduced, and therefore the quality of the hybrid integrated circuit is stabilized.

Further, according to a second aspect of the present invention, there is provided a trimming apparatus for a hybrid integrated circuit which includes a thick film substrate and a semiconductor element disposed on the thick film substrate, characterized in that the trimming apparatus comprises, a light-intercepting cap which is pressed against the thick film substrate so as to cover the semiconductor element simultaneously with a probing action in time of a functional trimming treatment, and an elastic member for pressing the light-intercepting cap against the thick film substrate, the elastic member being integrated with the light-intercepting cap. In the trimming apparatus, since the light-intercepting cap contacts to the thick film substrate very tightly in time of the trimming treatment, the correct trimming treatment is performed against the resistive portion of the hybrid integrated circuit so that the quality of the hybrid integrated circuit is stabilized, as same as the trimming apparatus according to the first aspect of the present invention. Moreover, the light-intercepting cap is disposed on the thick film substrate simultaneously with the probing action of the trimming apparatus, the manufacturing step of the hybrid integrated circuit is simplified, and therefore the productivity of the hybrid integrated circuit is improved.

Further, according to a third or fourth aspect of the present invention, there is provided the trimming apparatus in accordance with the first or second aspect of the present invention respectively, characterized in that the elastic member is any one of a spring, an elastic body made of rubber, an elastic body made of sponge and an air spring. In the trimming apparatus, since the elastic member is inexpensive, the manufacturing cost of the hybrid integrated circuit is reduced.

Further, according to a fifth aspect of the present invention, there is provided the trimming apparatus in accordance with the first aspect of the present invention, characterized in that a thickness of a side wall of the light-intercepting cap becomes smaller with a lowering of a situation in the side wall. In the trimming apparatus, the thickness of the lower portion of the side wall is considerably small. Consequently, even if interstices between the semiconductor element and other on-board members are very narrow, the light-intercepting cap can be disposed on the thick film substrate so as to cover the semiconductor element and not so as to interact with the other on-board members. Then, it is prevented to form an interstice between the light-intercepting cap and the thick film substrate so that the correct functional trimming treatment is performed.

Further, according to a sixth aspect of the present invention, there is provided the trimming apparatus in accordance with the first aspect of the present invention, characterized in that the light-intercepting cap is made of soft-type or otherwise pliable material (such as rubber or the like). In the trimming apparatus, the shading efficiency of the light-intercepting cap is improved so that the functional trimming treatment is performed correctly.

Still further, according to a seventh aspect of the present invention, there is provided a trimming method for a hybrid integrated circuit which includes a thick film substrate and a semiconductor element disposed on the thick film substrate, characterized in that the trimming method comprises the step of pressing a light-intercepting cap against the thick film substrate by means of an elastic member provided on the light-intercepting cap so as to cover the semiconductor element on the thick film substrate in time of a trimming treatment. In the trimming method, since the light-intercepting cap contacts to the thick film substrate very tightly in time of the trimming treatment, laser beam does not escape into the space formed in the light-intercepting cap in which the semiconductor element is accommodated. Consequently, the correct trimming treatment is performed against the resistive portion of the hybrid integrated circuit so that the variation of the electrical characteristic of the hybrid integrated circuit is reduced, and therefore the quality of the hybrid integrated circuit is stabilized.

Further, according to a eighth aspect of the present invention, there is provided a trimming method for a hybrid integrated circuit which includes a thick film substrate and a semiconductor element disposed on the thick film substrate, characterized in that the trimming method comprises the step of pressing a light-intercepting cap against the thick film substrate by means of an elastic member integrated with the light-intercepting cap so as to cover the semiconductor element on the thick film substrate simultaneously with a probing action in time of a functional trimming treatment. In the trimming method, since the light-intercepting cap contacts to the thick film substrate very tightly in time of the trimming treatment, the correct trimming treatment is performed against the resistive portion of the hybrid integrated circuit so that the quality of the hybrid integrated circuit is stabilized, as same as the trimming method according to the sixth aspect of the present invention. Moreover, the light-intercepting cap is disposed on the thick film substrate simultaneously with the probing action, the manufacturing step of the hybrid integrated circuit is simplified, and therefore the productivity of the hybrid integrated circuit is improved.

Further, according to a ninth or tenth aspect of the present invention, there is provided the trimming method in accordance with the seventh or eighth aspect of the present invention respectively, characterized in that the elastic member is any one of a spring, an elastic body made of rubber, an elastic body made of sponge and an air spring. In the trimming method, since the elastic member is inexpensive, the manufacturing cost of the hybrid integrated circuit is reduced.

Further, according to a eleventh aspect of the present invention, there is provided a trimming method for a hybrid integrated circuit which includes a thick film substrate and a semiconductor element disposed on the thick film substrate, characterized in that the trimming method comprises the steps of, applying a soft material onto a part of the thick film substrate previously, the part being to contact with a light-intercepting cap in time of a trimming treatment, and disposing the light-intercepting cap on the part of the thick film substrate to which the soft material has been applied so as to cover the semiconductor element on the thick film substrate prior to the trimming treatment. In the trimming method, since the contact ability of the light-intercepting cap against the thick film substrate is improved so that the light-intercepting ability of the light-intercepting cap. Consequently, the correct trimming treatment is performed against the resistive portion of the hybrid integrated circuit so that the variation of the electrical characteristic of the hybrid integrated circuit is reduced, and therefore the quality of the hybrid integrated circuit is stabilized.

Further, according to a twelfth aspect of the present invention, there is provided the trimming method in accordance with the eleventh aspect of the present invention, characterized in that the soft or pliable material is a silicone rubber. In the trimming method, since the silicone rubber is generally sold at a low cost, the manufacturing cost of the hybrid integrated circuit is reduced.

Further, according to a thirteenth aspect of the present invention, there is provided a trimming method for a hybrid integrated circuit which includes a thick film substrate and a semiconductor element disposed on the thick film substrate, characterized in that the trimming method comprises the step of applying a light-intercepting gel material onto the thick film substrate so as to cover the semiconductor element and a part or the whole part of on-board members loaded on the thick film substrate with the gel material prior to a trimming treatment. In the trimming method, since the surface of the semiconductor element is shaded by the gel material in time of the trimming treatment, the correct trimming treatment is performed against the resistive portion of the hybrid integrated circuit so that the quality of the hybrid integrated circuit is stabilized.

Further, according to a fourteenth aspect of the present invention, there is provided a trimming method for a hybrid integrated circuit which includes a thick film substrate and a semiconductor element disposed on the thick film substrate, characterized in that the trimming method comprises the step of covering a circumferential part of the semiconductor element with a silicone rubber or a light-intercepting gel material so as to fill an interstice formed by bumps between the thick film substrate and the semiconductor element with the silicone rubber or the light-intercepting gel material prior to a trimming treatment, thus to shade a surface of the semiconductor element in time of the trimming treatment. In the trimming method, since the interstice between the thick film substrate and the semiconductor element is filled with the silicone rubber so that the main surface of the semiconductor element is shaded by the silicone rubber in time of the trimming treatment, the correct trimming treatment is performed against the resistive portion of the hybrid integrated circuit so that the quality of the hybrid integrated circuit is stabilized.

Further, according to a fifteenth aspect of the present invention, there is provided a trimming method for a hybrid integrated circuit which includes a thick film substrate and a semiconductor element disposed on the thick film substrate, characterized in that the trimming method comprises the steps of, disposing a cap on the thick film substrate so as to cover the semiconductor element, the cap including a side wall portion capable of surrounding the whole part of the thick film substrate and a dam portion capable of surrounding a resistive portion which is disposed on the thick film substrate and is to be subjected to a functional trimming treatment, pouring a light-intercepting gel material into the cap not so as to cover the resistive portion, and performing the functional trimming treatment against the resistive portion. In the trimming method, since the semiconductor element is shaded by the gel material while the resistive portion is exposed outward in time of the trimming treatment, the correct trimming treatment is performed against the resistive portion of the hybrid integrated circuit so that the quality of the hybrid integrated circuit is stabilized.

Further, according to a sixteenth aspect of the present invention, there is provided a trimming method for a hybrid integrated circuit which includes a thick film substrate and a semiconductor element disposed on the thick film substrate, characterized in that the trimming method comprises the steps of, providing a dam member surrounding a resistive portion disposed on the thick film substrate thereon, the resistive portion being to be subjected to a functional trimming treatment, disposing a cap on the thick film substrate so as to cover the semiconductor element, the cap including a side wall portion capable of surrounding the whole part of the thick film substrate, pouring a light-intercepting gel material into the cap not so as to cover the resistive portion, and performing the functional trimming treatment against the resistive portion. In the trimming method, since the semiconductor element is shaded by the gel material while the resistive portion is exposed outward in time of the trimming treatment, the correct trimming treatment is performed against the resistive portion of the hybrid integrated circuit so that the quality of the hybrid integrated circuit is stabilized.

BRIEF DESCRIPTION OF THE DRAWINGS

These and other objects, features and advantages of the present invention will become clear from the following description taken in conjunction with the preferred embodiments with reference to the accompanying drawings throughout which like parts are designated by like reference numerals, and in which.

DETAILED DESCRIPTION OF THE PREFERRED EMBODIMENT

Hereinafter, several preferred embodiments of the present invention will be concretely described with reference to the accompanying drawings.

<The First Embodiment>

Figure 1:
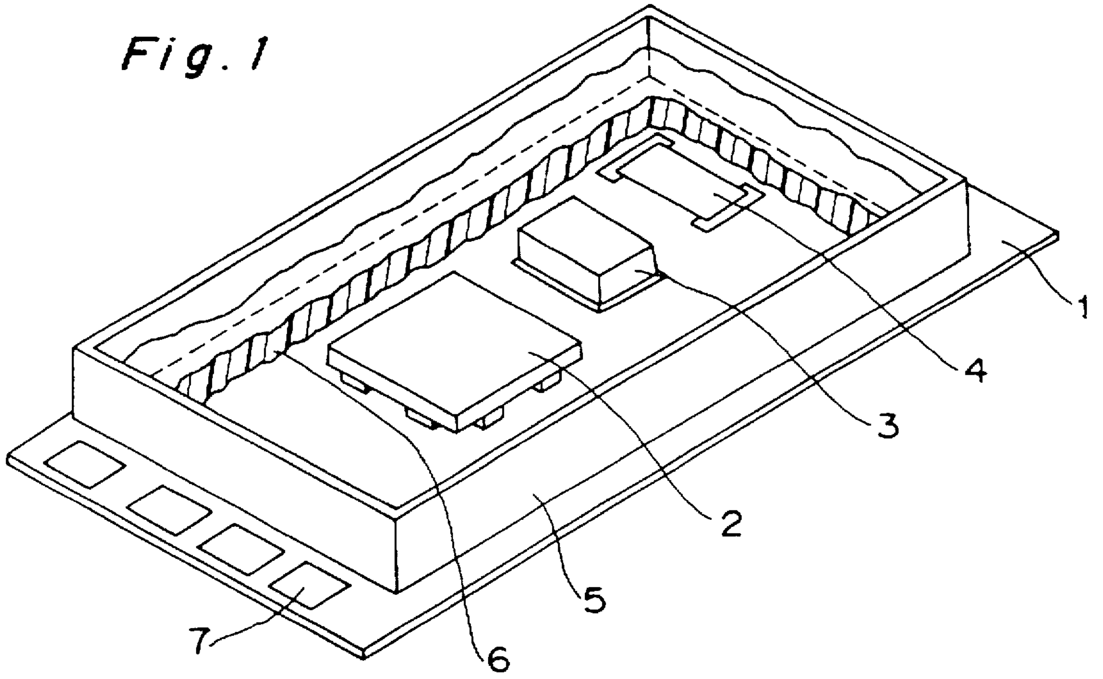
FIG. 1 is a partially sectional perspective view of a hybrid integrated circuit to which the present invention is applied.
Figure 2:
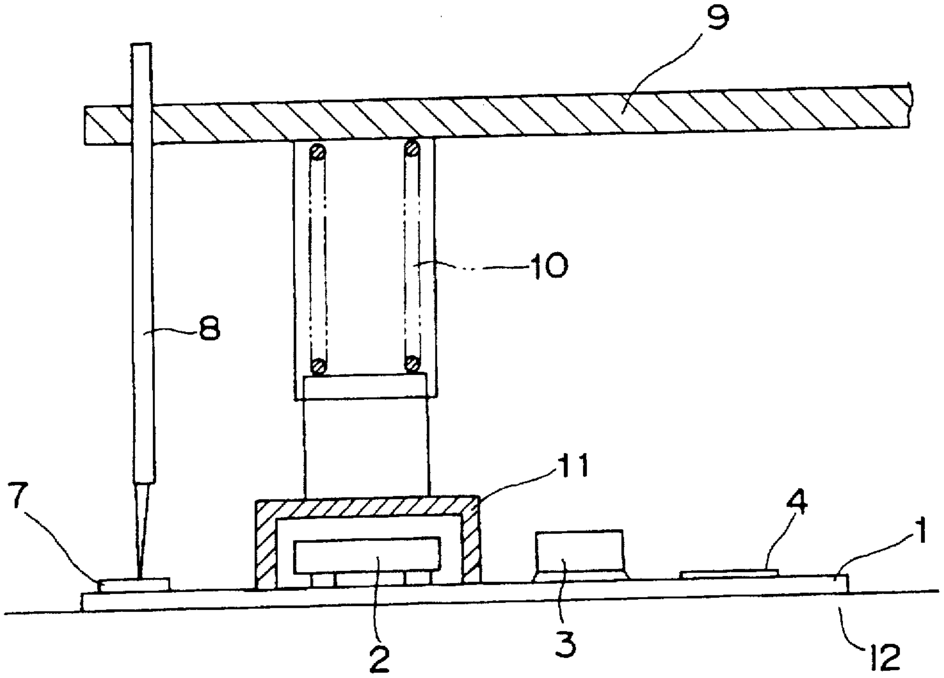
FIG. 2 is a partially sectional side view of a trimming apparatus with the hybrid integrated circuit according to the first embodiment of the present invention, the trimming apparatus having a light-intercepting cap for a semiconductor element, a spring disposed on the light-intercepting cap and a probe pin.

In FIG. 2, there is shown a trimming apparatus or a trimming method for the same hybrid integrated circuit as shown in FIG. 1 according to the first embodiment of the present invention.

As shown in FIG. 2, the hybrid integrated circuit comprises a thick film substrate 1, a semiconductor element 2 connected to the thick film substrate 1 by means of flip chip bonding, on-board members 3 loaded on the thick film substrate 1 such as a chip condenser and the like, a thick film resistor 4 which is subjected to a functional trimming treatment, and electrode pads 7 for connecting the hybrid integrated circuit to outer electrical devices. On the other hand, the trimming apparatus comprises a probe pin 8 which can contact electrically to the hybrid integrated circuit, a probe board 9 which fixes and attaches the probe pin 8 to the main body of the trimming apparatus, a spring 10 attached to the probe board 9 as same as the probe pin 8, a light-intercepting cap 11 for shading the semiconductor element 2, and a pedestal 12 for holding the hybrid integrated circuit.

In general, the functional trimming treatment against the thick film resistor 4 is performed while the resistance value of the thick film resistor 4 is being measured, after the probe pin 8 is contacted to the electrode pad 7 by adjusting the height of the pedestal 12 holding the hybrid integrated circuit with an up-and-down moving action of the pedestal 12.

In the first embodiment, as shown in FIG. 2, the light-intercepting cap 11 is contacted to the thick film substrate 1 with the up-and-down moving action of the pedestal 12, and then is pressed to the thick film substrate 1 by the spring 10 attached to the probe board 9 in time of the functional trimming treatment. Thus, the contacting ability of the light-intercepting cap 11 against the thick film substrate 1 is improved so that the light-intercepting operation or effect is improved, to form a substantially light-tight seal. Consequently, the functional trimming treatment is performed correctly.

Further, if the light-intercepting cap 11 is preferably attached or integrated to the spring 10 previously, the step of setting the light-intercepting cap 11 on the thick film substrate 1 is unnecessary at the time of disposing the hybrid integrated circuit on the pedestal 12. Therefore, in this case, the manufacturing process is simplified or reduced so that the efficiency of the manufacturing operation is improved.

<The Second Embodiment>

Figure 3:
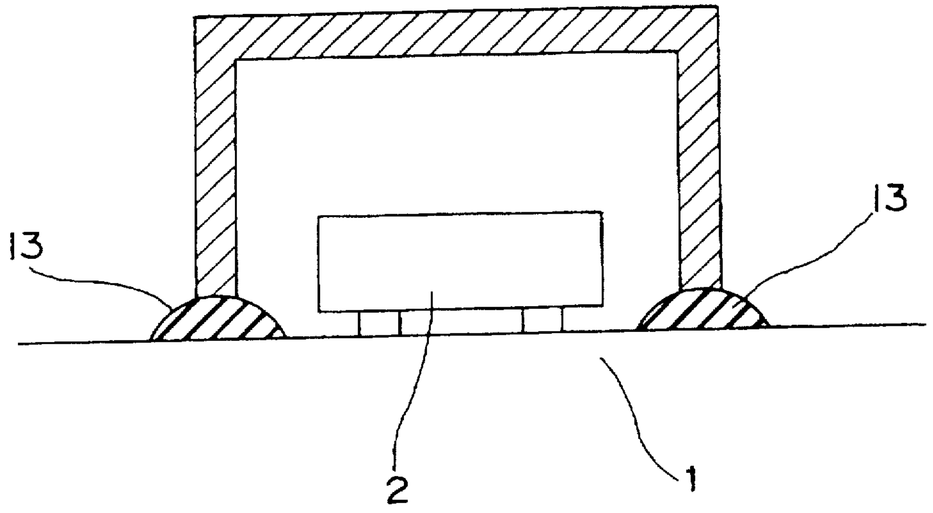
FIG. 3 is a partially sectional side view of a trimming apparatus with the hybrid integrated circuit according to the second embodiment of the present invention, the view illustrating the step of applying a soft material between a thick film substrate and a light-intercepting cap in a trimming treatment.

In FIG. 3, there is shown a trimming apparatus or a trimming method for the hybrid integrated circuit according to the second embodiment of the present invention. In FIG. 3, the duplicate members for the trimming apparatus or the hybrid integrated circuit shown in FIG. 1 or 2 have the same reference numerals as that in FIG. 1 or 2.

As shown in FIG. 3, in the second embodiment, a silicone rubber 13 is interposed between the light-intercepting cap 11 and the thick film substrate 1.

When the functional trimming treatment is performed against the thick film resistor 4, the semiconductor element 2 disposed on the thick film substrate 1 of the hybrid integrated circuit is generally covered with the light-intercepting cap 11 to shade the semiconductor element 2, as shown in FIG. 2. In this case, if the silicone rubber 13 is applied to a surface of the thick film substrate 1 of the hybrid integrated circuit previously as shown in FIG. 3 showing the second embodiment, the surface being to contact with the light-intercepting cap 11, the contacting ability of the light-intercepting cap 11 against the thick film substrate 1 is improved so that the shading efficiency or light-tight sealing ability of the light-intercepting cap 11 is improved. In the second embodiment, since the silicone rubber 13 is generally sold in low price, the manufacturing cost of the hybrid integrated circuit is not substantially increased.

Hereat, the light-intercepting cap 11 made of hard-type material such as plastic has been used conventionally. However, if the light-intercepting cap 11 made of soft-type or otherwise pliable material such as rubber or the like, the shading efficiency of the light-intercepting cap 11 is improved without using the silicone rubber 13 so that the functional trimming treatment is performed correctly.

<The Third Embodiment>

Figure 4:
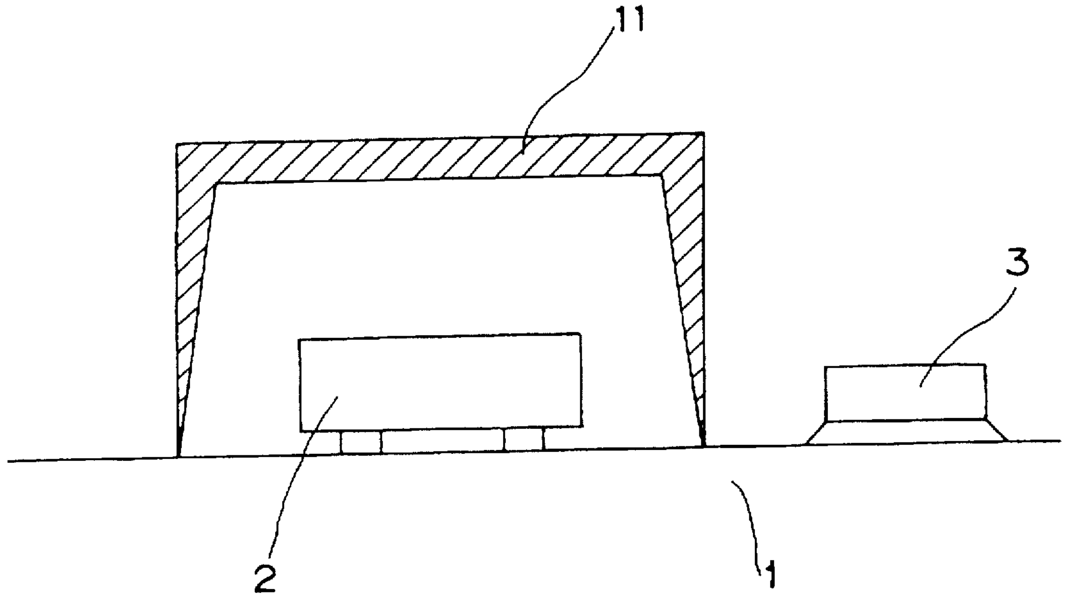
FIG. 4 is a partially sectional side view of a trimming apparatus with the hybrid integrated circuit according to the third embodiment of the present invention, wherein a light-intercepting cap has a tapered side wall.

In FIG. 4, there is shown a trimming apparatus or a trimming method for the hybrid integrated circuit according to the third embodiment of the present invention. In FIG. 4, the duplicate members for the trimming apparatus or the hybrid integrated circuit shown in FIG. 1 or 2 have the same reference numerals as that in FIG. 1 or 2.

When the functional trimming treatment is performed against the thick film resistor 4, if an interstice between the semiconductor element 2 and another on-board member 3 is not sufficiently wide, it is probable that the light-intercepting cap 11 rides on the on-board member 3 in case of causing a slight situation slip of the light-intercepting cap 11 so that the light-intercepting cap 11 does not accomplish its shading function. Thus, in this case, a correct resistance value adjustment by the functional trimming treatment cannot be achieved due to the incomplete shading, and moreover according to circumstances, it is probable that the semiconductor element 2 is broken off due to an excessive stress applying to the semiconductor element 2.

In the third embodiment, therefore, in order to prevent the above-mentioned disadvantage, the side wall of the light-intercepting cap 11 is tapered. The tapered side wall is formed such a shape that the thickness of the side wall becomes smaller with lowering the situation in the side wall so that the light-intercepting cap 11 hardly interact with the semiconductor element 2 or the other on-board member 3. Consequently, even if the interstice between the semiconductor element 2 and another on-board member 3 is not sufficiently wide, the light-intercepting cap 11 is disposed on the thick film substrate 1 so as to cover the semiconductor element 2 correctly, preventing the light-intercepting cap 11 to ride on the other on-board member 3 in case of causing a slight situation slip of the light-intercepting cap 11. Thus, it is prevented to occur an interstice between the light-intercepting cap 11 and the thick film substrate 1 so that the correct functional trimming treatment is performed.

<The Fourth Embodiment>

Figure 5:
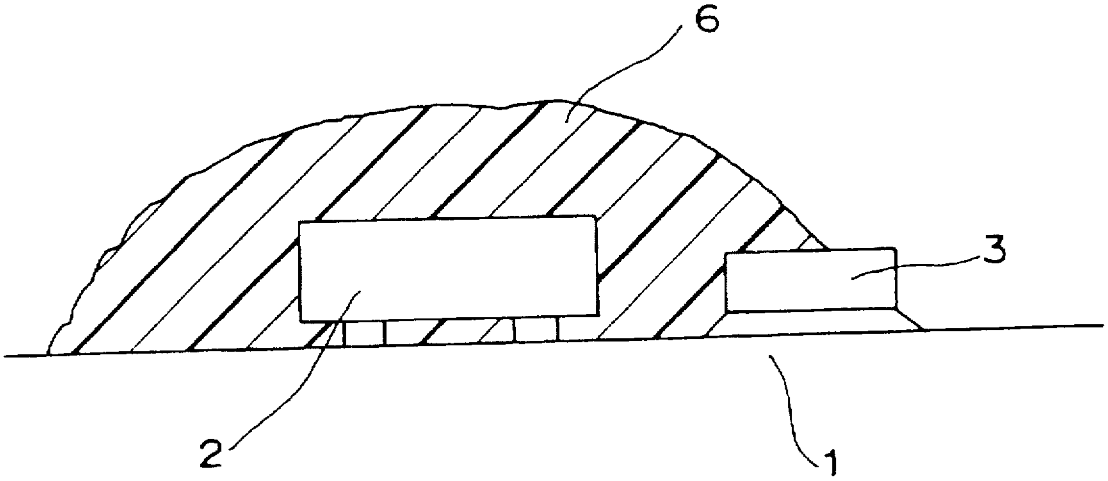
FIG. 5 is a partially sectional side view of a trimming apparatus with the hybrid integrated circuit according to the fourth embodiment of the present invention, the view illustrating the step of covering the semiconductor element and another on-board member with a gel material in a trimming treatment.

In FIG. 5, there is shown a trimming apparatus or a trimming method for the hybrid integrated circuit according to the fourth embodiment of the present invention. In FIG. 5, the duplicate members for the trimming apparatus or the hybrid integrated circuit shown in FIG. 1 or 2 have the same reference numerals as that in FIG. 1 or 2.

When an interstice between the semiconductor element 2 and another on-board member 3 is extremely narrow, even if the light-intercepting cap 11 according to the third embodiment is used, it is impossible to dispose the light-intercepting cap 11 on the thick film substrate 1 preventing the light-intercepting cap 11 to ride on the other on-board member 3. Therefore, in the fourth embodiment, the semiconductor element 2 and a part (or the whole part) of the other on-board member 3 are covered with a black light-intercepting gel material 6 so that the semiconductor element 2 is shaded by the gel material 6. Consequently, the correct functional trimming treatment is performed.

<The Fifth Embodiment>

Figure 6:
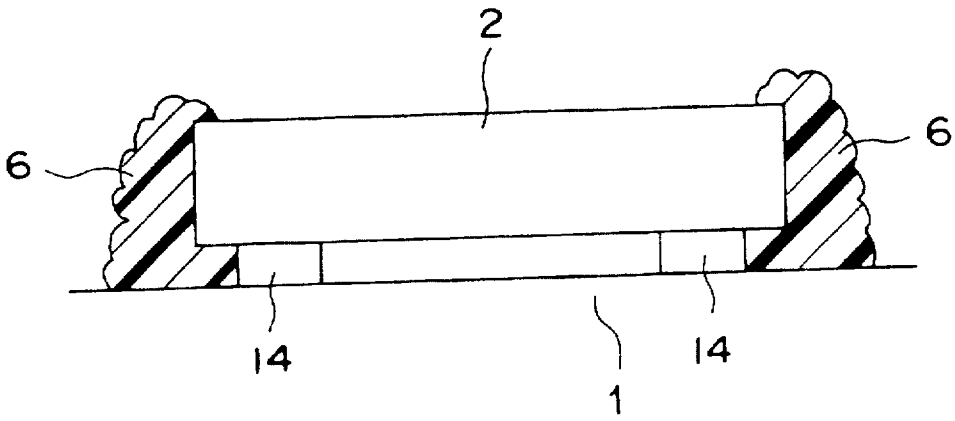
FIG. 6 is a partially sectional side view of a trimming apparatus with a hybrid integrated circuit according to the fifth embodiment of the present invention, the view illustrating the step of covering the circumferential part of the semiconductor element with a silicone rubber or the like in a trimming treatment.
Figure 7:
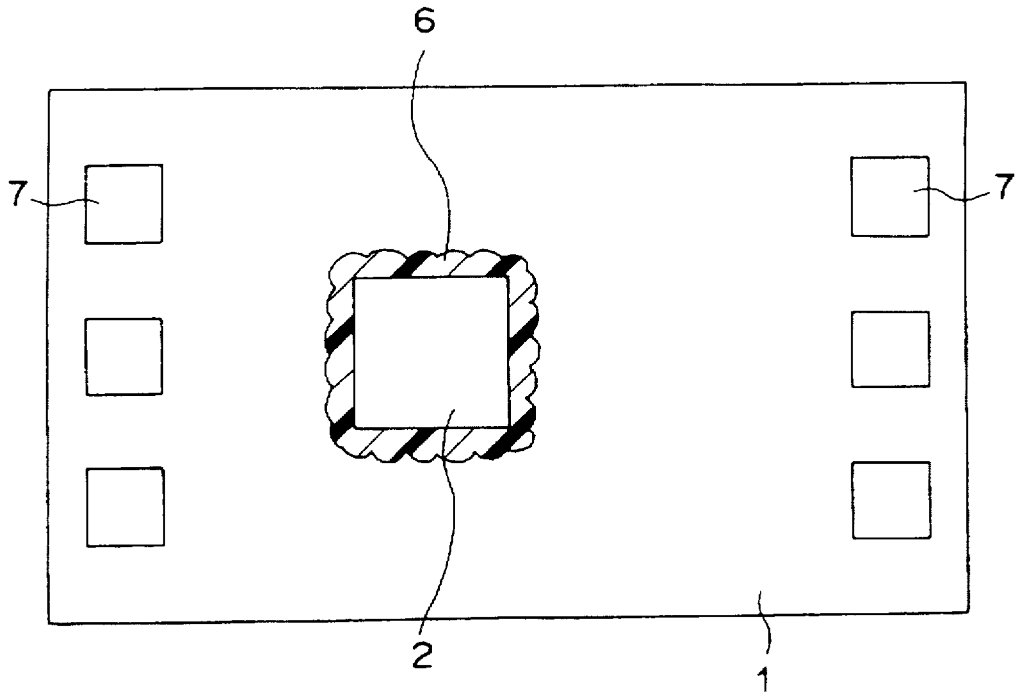
FIG. 7 is a partially sectional top plane view of the trimming apparatus with the hybrid integrated circuit according to the fifth embodiment of the present invention, the view illustrating the step of covering the circumferential part of the semiconductor element with the silicone rubber or the like in the trimming treatment.

In FIGS. 6 and 7, there are shown a partially sectional side view and a partially sectional top plane view of a trimming apparatus for the hybrid integrated circuit according to the fifth embodiment of the present invention, respectively. In FIG. 6 or 7, the duplicate members for the trimming apparatus or the hybrid integrated circuit shown in FIG. 1 or 2 have the same reference numerals as that in FIG. 1 or 2.

In the fifth embodiment, as shown in FIG. 6, the hybrid integrated circuit comprises bumps 14 (electrode portions) disposed between the thick film substrate 1 and the semiconductor element 2. Further, the semiconductor element 2 is disposed in such a manner that the main surface of the semiconductor 2 on which elements are mounted faces downward, and is connected to the thick film substrate 1 via the bumps 14 (electrode portions). Thus, only an interstice formed by the bumps 14 between the thick film substrate 1 and the semiconductor element 2 is filled with the light-intercepting gel material 6 (or the silicone rubber 13), and then the semiconductor element 2 is shaded by the gel material 6 or the silicone rubber 13 so that the correct functional trimming treatment is performed. Therefore, it is not necessary to cover the whole part of the semiconductor element 2 with the gel material 6, in contrast with the above-mentioned case of the fourth embodiment.

<The Sixth Embodiment>

Figure 8:
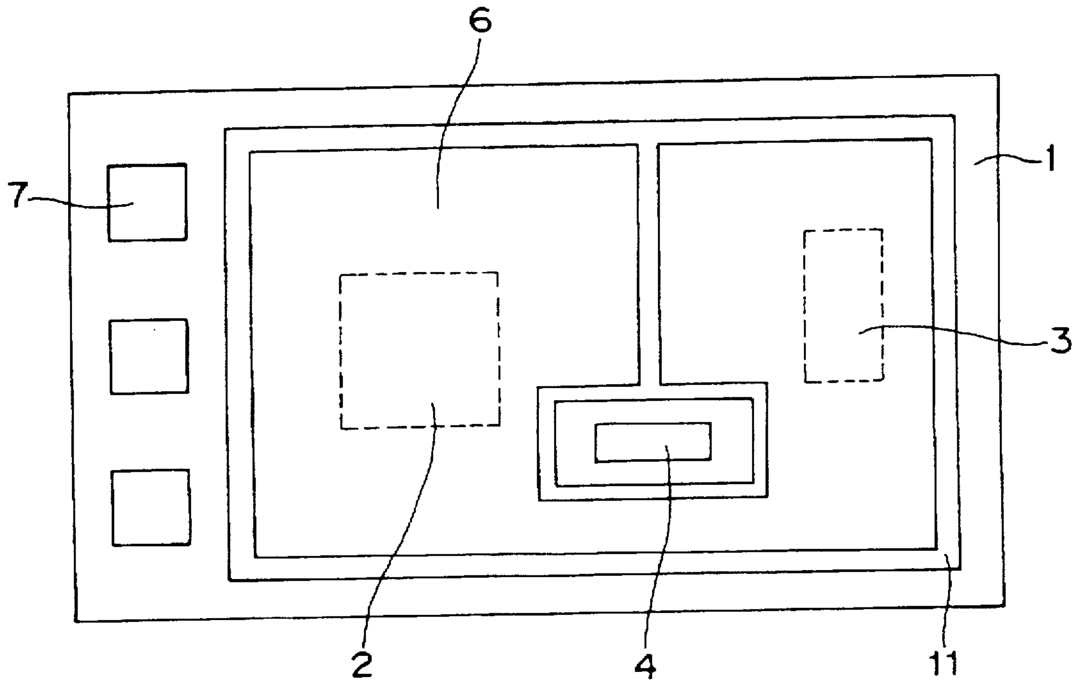
FIG. 8 is a top plane view of a protective cap with the hybrid integrated circuit for performing a trimming treatment, the protective cap having a dam portion therein.

In FIG. 8, there is shown a trimming apparatus or a trimming method for the hybrid integrated circuit according to the sixth embodiment of the present invention. In FIG. 8, the duplicate members for the trimming apparatus or the hybrid integrated circuit shown in FIG. 1 or 2 have the same reference numerals as that in FIG. 1 or 2.

In the sixth embodiment, the whole part of the hybrid integrated circuit is covered with a light-intercepting material 16 except that the thick film resistor 4 to be subjected to a functional trimming treatment is exposed outward (is not covered), in contrast with the other embodiments, in each of which only the semiconductor element 2 is covered with the light-intercepting means (the light-intercepting cap 11 or the gel material 6).

Particularly, in a certain kind of hybrid integrated circuit, it is probable that after the protective cap 5 which is to cover the whole part of the thick film substrate 1 is joined onto the thick film substrate 1, the gel materials 6 is poured into the space formed in the protective cap 5 so that the hybrid integrated circuit is completed (see FIG. 1). In this case, after a protective cap 5 having a dam portion which can surround the thick film resistor 4 to be trimmed in time of the functional trimming treatment is joined to the thick film substrate 1, a black (light-intercepting) gel material 6 is pouring into the space formed in the protective cap 5 so that the semiconductor element 2 and the like are covered with the gel material 6 but the thick film resistor 4 surrounded by the dam portion of the protective cap 5 is not covered with the gel material 6. Thus, in such condition, the functional trimming treatment is performed. In this case, since the semiconductor element 2 is shaded by the black gel material 6, a laser beam for trimming is not applied to the semiconductor element 2 so that an incorrect action of the hybrid integrated circuit is not caused. Thus, the trimming treatment with the characteristic corresponding the aim may be performed.

Further, in this embodiment, instead of the dam portion provided to the protecting cap 5, a dam portion surrounding the thick film resistor 4 may be directly provided 4 on the thick film substrate 1. This dam portion directly provided to the thick film substrate 1 is formed to bond some frames on the thick film substrate 1 so as to surround the thick film resistor 4, or to apply a generally sold inexpensive silicone rubber type adhesive used for adhering the protective cap 5 onto the thick film substrate 1 so as to surround the thick film resistor 4.

Although the present invention has been described in terms of preferred embodiments, it will be apparent to those of skill in the art that numerous variations and modifications may be made without departing from the true spirit and scope thereof, as set forth in the following claims.

What is claimed is:

1. A trimming apparatus for trimming a thick film resistor on a hybrid integrated circuit including a thick film substrate and a semiconductor element disposed on the thick film substrate wherein the thick film resistor is separately disposed on the thick film substrate away from the semiconductor element, comprising:

a light-intercepting cap covering the semiconductor element on the thick film substrate when a trimming treatment is performed;

seal establishing means for establishing a substantially light-tight seal between said light-intercepting cap and the thick film substrate, and trimming means for performing the trimming treatment on the thick film resistors, said seal establishing means including a reduced-thickness side wall of said light-intercepting cap which is thinner at a lower portion of said side wall than at an upper portion of said side wall.

2. The trimming apparatus according to claim 1;

said seal establishing means including an elastic member pressing said light-intercepting cap against the thick film substrate when the trimming treatment is performed, said elastic member being disposed on said light-intercepting cap.

3. The trimming apparatus according to claim 2, said elastic member including any one of a spring, an elastic body made of rubber, an elastic body made of sponge and an air spring.

4. The trimming apparatus according to claim 1;

said seal establishing means including an elastic member pressing said light-intercepting cap against the thick film substrate, said elastic member being integrated with said light-intercepting cap.

5. The trimming apparatus according to claim 4, said elastic member including any one of a spring, an elastic body made of rubber, an elastic body made of sponge and an air spring.

6. The trimming apparatus according to claim 1, said light-intercepting cap being made of a pliable material.

7. The trimming apparatus according to claim 1, said seal improving means including a pliable material interposed between the thick film substrate and said light-intersecting cap, said pliable material contacting both said light-intersecting cap and the thick film substrate when the trimming treatment is performed.

8. The trimming apparatus according to claim 7, said pliable material being made of silicone rubber.

9. A trimming method for trimming a thick film resistor on a hybrid integrated circuit including a thick film substrate and a semiconductor element disposed on the thick film substrate wherein the thick film resistor is separately disposed on the thick film substrate away from the semiconductor element, comprising the steps of:

placing a light-intercepting cap against the thick film substrate to cover the semiconductor element on the thick film substrate; and establishing a substantially light-tight seal between the light-intercepting cap and the thick film substrate; and trimming the resistor in the hybrid integrated circuit to adjust a resistance value of the resistor, said seal establishing step including the substep of providing the light-intercepting cap with a reduced-thickness sidewall which is thinner at a lower portion of the sidewall than at an upper portion of the sidewall.

10. The trimming method according to claim 9, said seal establishing step including the substep of pressing the light-intercepting cap against the thick film substrate with an elastic member provided on the light-intercepting cap.

11. The trimming method according to claim 10, said seal establishing step including that substep of forming the elastic member with any one of a spring, an elastic body made of rubber, an elastic body made of sponge and an air spring.

12. The trimming method according to claim 9, said seal establishing step including the substep of pressing the light-intercepting cap against the thick film substrate with an elastic member integrated with the light intercepting cap so as to cover the semiconductor element on the thick film substrate simultaneously with a probing action when said trimming step is performed.

13. The trimming method according to claim 12, said seal establishing step including that substep of forming the elastic member with any one of a spring, an elastic body made of rubber, an elastic body made of sponge and an air spring.

* * * * *